Patented Sept. 6, 1949

2,481,323

UNITED STATES PATENT OFFICE 2,481,323

BITUMINOUS EMULSIONS AND THE LIKE

Paul E. McCoy, San Francisco, and George S. Smith, Berkeley, Calif., assignors, by mesne assignments, to Stancal Asphalt & Bitumuls Company, San Francisco, Calif., a corporation of Delaware No Drawing. Application April 26, 1946, Serial No. 665,330

16 Claims. (Cl. 106—277)

This invention relates to bituminous emulsions of the oil-in-water type; more particularly, it relates to quick-breaking emulsions containing an added material to promote adhesion of the asphalt to hydrophilic aggregate.

In the art of bituminous paving compositions, a problem of considerable and increasing importance is the phenomenon known as "stripping." When a bituminous binder is mixed with aggregate, it frequently happens that upon exposure to moisture the coating of bitumen loses its adherence to or strips from the aggregate. This is especially true in the case of certain types of aggregates known as hydrophilic aggregates, for example, Massachusetts rhyolite, Louisiana slick gravel, Olympia sand from Stockton, California, and Greenbrae aggregate from Greenbrae Quarry, Marin County, California. All of these particular aggregates are siliceous aggregates. Some non-siliceous aggregates, such as certain types of limestone, have hydrophilic tendencies.

The most advantageous means of solving the problem of stripping is the addition of a small amount of "anti-stripping" or "adhesion" agent to the bituminous binder. Many such anti-stripping or adhesion agents have been proposed and some of them are in commercial use. Most of these agents, however, are applicable only to non-aqueous binders or to water-in-oil emulsions; that is, they can be used only where the bitumen is in the continuous phase. Some of these materials, such as lead naphthenate, because they are insoluble in water, cannot be added to oil-in-water type emulsions, which are much used as binders in coating agents in the paving and allied industries. Others, such as ferric chloride, although soluble in the aqueous phase of oil-in-water emulsions, are subject to the grave disadvantage that they break or partially break the emulsion.

It is apparent that the problem of improving the adhesion or anti-stripping properties of oil-in-water type bituminous emulsions, that is to say, modifying these emulsions so that when the emulsion is mixed with aggregate and the mixture allowed to dry, a firm, stable bond between the bitumen and the aggregate results, is more difficult than the problem of improving the adhesion properties of bituminous binders in which the bitumen is present in continuous phase. Nevertheless, this problem has been very satisfactorily solved by the use of water-soluble salt of oxy-acids of chromium, more particularly, the alkali metal dichromates, such as $Na_2Cr_2O_7$ and $K_2Cr_2O_7$. These salts are soluble in water and, therefore, can be incorporated in the aqueous phase of oil-in-water emulsions. Moreover, their tendency to break emulsions is much less than that of salts such as the aforesaid ferric chloride. They can be incorporated in the more stable oil-in-water emulsions, that is, mixing or slow-setting emulsions and semi-mixing or medium-setting emulsions, in amount sufficient substantially to increase the adhesiveness of these emulsions to hydrophilic aggregate, without any significant tendency to break the emulsion.

This latter method, that is, the use of water-soluble salts of oxy-acids of chromium, is, however, limited in its application by the fact that these salts, and more particularly, the most effective of these salts, that is to say, the alkali metal dichromates, have a tendency to break quick-setting or quick-breaking emulsions, or at least to cause excessive shot formation.

By "quick-breaking" emulsions, as used herein, is meant emulsions which break quickly upon contact with aggregates and which undergo not less than 60% demulsification in the ASTM D401–40 Demulsibility Test, employing 35 ml. of 0.02N calcium chloride.

It is an object of the invention to provide a means of improving the adhesiveness to aggregates and the like, of oil-in-water type emulsions of bituminous materials and other water-insoluble, water-dispersible, thermoplastic organic materials.

It is a further object of the present invention to provide a means of improving the adhesiveness to hydrophilic aggregate of quick-breaking emulsions of bituminous materials and other water-insoluble, water-dispersible, thermoplastic organic materials.

It is a further object of the present invention to improve the adhesiveness of quick-breaking bituminous emulsions without substantially impairing the stability of these emulsions.

It is a particular object of the present invention to provide a means of incorporating water-soluble salts of oxy-acids of chromium, more particularly, alkali metal dichromates, in quick-breaking emulsions in quantity sufficient substantially to improve the adhesiveness of these emulsions to hydrophilic aggregate without, however, breaking these emulsions or causing excessive shot formation.

We have discovered that by incorporating an alkali metal dichromate in an emulsion in the presence of a volatile or fugitive nitrogen base, the tendency of the dichromate to break the emulsion, or to cause shot formation or to have other undesirable effects is greatly diminished or completely avoided.

Our discovery is applicable to any emulsion, whether quick-breaking, medium-breaking or slow-breaking, but it is most advantageously applied to quick-breaking emulsions, since by means of the conjoint use of dichromate and a volatile or fugitive nitrogen base, adhesion of the dispersed material to hydrophilic aggregate is improved yet undesirable effects associated with the use of dichromates are greatly reduced or completely avoided.

Examples of suitable volatile or fugitive nitrogen bases are ammonia, morpholine, trimethylamine, methylamine, ethylamine, ethylene diamine, diethyl amino ethanol $$[(C_2H_5)_2N \cdot CH_2 \cdot CH_2 \cdot OH]$$

and ethyl monoethanolamine $$(C_2H_5NH \cdot CH_2 \cdot CH_2 \cdot OH)$$

In general, a "volatile or fugitive nitrogen base" as herein used may be defined as a nitrogen base which is water-soluble and which evaporates at 77° F. and atmospheric pressure. Bases which are soluble in water at 77° F. in the amount of 1% or more and which boil under atmospheric pressure at 200° C. or less are suitable for the purposes of the present invention.

The emulsions employed in accordance with the invention may be prepared by methods well known in the art. For example, if asphalts are available which are emulsifiable in hot, dilute, aqueous caustic alkali solution without the aid of an added emulsifying agent, they may be emulsified by the methods of Montgomerie U. S. Patent No. 1,643,675 and Braun U. S. Patent No. 1,737,491. Where such asphalts are not available, quick-breaking emulsions may be prepared by use of a very small amount (e. g., 0.05–0.1%) of saponifiable material, such as oleic acid, Vinsol resin or rosin oil. Emulsions so produced are quick-breaking and may be used as such, in conjunction with the above-mentioned chromium salts. Or they may be stabilized to produce slow-breaking or medium-breaking emulsions, by methods well known in the art. Slow-breaking and medium-breaking asphalt emulsions may also be prepared in a single step, by charging molten asphalt and a hot aqueous alkaline solution of emulsifying and stabilizing agents to a colloid mill.

Emulsions of other bituminous materials such as coal tar, coal tar pitch, paraffin wax, ester gum, and, indeed, emulsions of any water-insoluble, water-dispersible organic material (e. g., acrylic resins, vinyl resins, alkyd resins), are susceptible to improvement by the procedure of the invention. The procedure as applied to emulsions of these non-asphaltic and non-bituminous materials, and the improved emulsions resulting therefrom, are within the broad scope of the invention.

These emulsions, however prepared, will usually contain about 55 to 65% by weight of asphalt or other dispersed material based upon emulsion. The quantity of dispersed material may be either higher or lower, as circumstances require. The ASTM D401–40 specification for quick-setting asphalt emulsions specifies a viscosity (Saybolt furol at 77° F.) of not less than 20 nor more than 100 seconds, a residue of not less than 55 nor more than 60%, a demulsibility (35 mls. 0.02N CaCl2) of not less than 60% and a sieve test (20 mesh) of not more than 0.1%. Ordinarily, emulsions meeting these specifications will be used. However, since specifications are subject to change from time to time and since requirements may vary from place to place, the specifications of the basic quick-breaking emulsion may vary in one or more respects from those of the above, preferred set of specifications.

In accordance with the invention, there is incorporated in the emulsion a small amount of alkali metal dichromate, such as lithium, sodium or potassium dichromate, and a fugitive nitrogen base. This may be accomplished in any one of several ways; for example, as follows:

Preferably, an aqueous solution of alkali metal dichromate of, say, 10% concentration is prepared. To this solution is added the nitrogen base in amount sufficient to increase the pH of the solution (which is normally acid, having a pH less than 7) to about 7 to 9.5. The thus treated dichromate solution is then added to the emusion; or it is added to the alkaline water used for emulsification and this water, along with the asphalt or other material to be dispersed, is introduced into suitable emulsifying apparatus to produce the emulsion. The dichromate solution treated with the nitrogen base is incorporated in the emulsion in an amount sufficient to produce the desired adhesion promoting effect; ordinarily, this will require about 0.1 to 0.5% of chromium salt, reckoned as $M_2Cr_2O_7$, where M is the alkali metal. However, percentages as low as 0.05% may suffice, and percentages as high as 1% or even higher may, upon occasion, be required.

Where the emulsions to be treated is sufficiently stable (e. g., a medium-breaking or a slow-breaking emulsion) the nitrogen base need not be added in such large amount; that is, the pH of the dichromate solution need not be increased quite to 7.

Alternatively, the nitrogen base may be added directly to the emulsion or to the alkaline water used for emulsification, followed by addition of the dichromate. Otherwise, the same directions as to proportions are applicable.

The improvement in adhesion effected by means of the invention undergoes some deterioration as the emulsion ages. Hence, it is preferred to use the emulsion before it has aged very long. However, this deterioration takes place sufficiently slowly that emulsion can be stored for a considerable period of time and still pass stringent adhesion tests.

The following specific examples will serve to illustrate the practice and advantages of the invention.

EXAMPLE 1

A quick-breaking emulsion was prepared by emulsifying 56 parts by weight of hot, molten 275 penetration California asphalt refined from San Joaquin Valley crude petroleum, in 44 parts by weight of hot 0.32% aqueous NaOH solution. A 10% aqueous solution of sodium dichromate was prepared and to separate portions of this solution morpholine was added in differing proportions. pH measurements were made on these various solutions, with results as follows:

TABLE I

*Dichromate-morpholine solutions*

| | Per Cent $Na_2Cr_2O_7$ | Per Cent Morpholine | pH |
|---|---|---|---|
| A | 10 | nil | 4.5 |
| B | 10 | 1.93 | 6.6 |
| C | 10 | 3.85 | 7.2 |
| C | 10 | 7.70 | 8.7 |
| D | 10 | 11.55 | 9.1 |

In the above table, percentages are by weight based on solution.

Solutions A to D were added slowly and with stirring to different portions of the above-described quick-breaking emulsion, each in such amount as to incorporate in the emulsion 0.25% by weight of chromium salt, reckoned as $Na_2Cr_2O_7$. Each emulsion was submitted to an adhesion test (described below) and each was observed after 24 hours storage at room temperature to note the presence of breakdown. Results are given in Table II, below:

TABLE II

| | pH | Adhesion | Condition after Storage |
|---|---|---|---|
| Emulsion+solution A | 6.6 | | Badly broken. |
| Emulsion+solution B | 7.2 | 90 | Very slight grain. |
| Emulsion+solution C | 8.7 | 90 | No grain—perfectly smooth. |
| Emulsion+solution D | 9.1 | 90 | Do. |

The adhesion test referred to above was carried out as follows: 200 grams of dry standard Massachusetts rhyolite (obtained from the Central Scientific Company, Cambridge, Massachusetts), graded so as to pass entirely through a ¼-inch (No. 3) sieve and to be retained completely on a No. 10 sieve, were taken. This aggregate was heated to 300° F. and mixed with 16 grams of emulsion until complete coating resulted. Three 50 gram samples of the coated aggregate were then taken and each was spread thinly on a metal can lid and left in an oven for 48 hours at 140° F. Each cured sample was then dropped into 400 cc. of boiling distilled water in a 600 cc. beaker and stirred 3 minutes at the rate of 60 times a minute, boiling meanwhile being continued. Each beaker was then removed from the heat and, after ebullition had ceased, cold water was run into the beaker through a submerged hose until any film of asphalt on the surface of the water was flushed out. Each sample of aggregate was then removed and placed on absorbent paper and air dried. The dried samples were then inspected visually by an experienced observer to estimate the percentage area coated, uncoated area being deemed that retaining no asphaltic coating. The figures for the three samples were then averaged.

By way of comparison, upon adding to the same quick-breaking emulsion 0.25% of sodium dichromate in the absence of morpholine, the emulsion would be broken to a considerable degree.

By way of examples of application of the present invention to slow-breaking emulsions, a 10% aqueous sodium dichromate solution treated with morpholine or other suitable fugitive nitrogen base, in amount sufficient to increase the pH to 7 to 9.5, may be added to any of the following slow-breaking emulsions, in such amount as to incorporate 0.1 to 0.5% of chromium salt (reckoned as $Na_2Cr_2O_7$) based on the weight of emulsion.

*Example 2*

| | Per cent |
|---|---|
| Quick-breaking asphalt emulsion of Example 1 | 98.6 |
| Saponified Vinsol resin | 1.5 |

*Example 3*

| | |
|---|---|
| Asphalt | 55% |
| Aqueous alkaline solution | 45% |
| Water | 43.85% |
| NaOH | 0.15% |
| Water-soluble blood solids | 1.0% |

In making this last emulsion, the asphalt in hot, molten form and the hot aqueous solution may be charged in the proportions indicated to a colloid mill to produce the desired emulsion.

We claim:

1. In the process of incorporating an alkali metal dichromate in a bituminous, oil-in-water type emulsion, the emulsified state of which is normally subject to breakdown by the addition thereto of such alkali metal dichromate, the improvement which comprises forming an aqueous solution of said alkali metal dichromate, dissolving in such aqueous alkali metal dichromate solution, in a small amount sufficient to raise the pH of said aqueous solution to within the range of about 7 to 9.5, a water-soluble, volatile, fugitive nitrogen base having an atmospheric pressure boiling point not higher than 200° C. and then incorporating said aqueous solution, with its pH so raised, in the said bituminous emulsion, in a small amount sufficient substantially to promote adhesion of the dispersed material to hydrophilic aggregate.

2. The process of claim 1 wherein the fugitive nitrogen base is morpholine.

3. The process of claim 1 wherein the emulsion in which the said aqueous solution is incorporated has a demulsibility by the A. S. T. M. D401-40 test of at least 60%.

4. The process of making an oil-in-water type emulsion which is characterized by improved adhesion of the dispersed material to hydrophilic aggregates and improved resistance to deterioration of the emulsified state, comprising dispersing an organic water-insoluble, water-dispersible, thermoplastic, resinous substance in water to produce an emulsion, the emulsified state of which is normally subject to deterioration by the addition thereto of an aqueous alkali metal dichromate solution, and incorporating in said emulsion a small amount, sufficient substantially to promote adhesion of the dispersed material to hydrophilic aggregate, of an aqueous alkali metal dichromate solution, said aqueous alkali metal dichromate solution having dissolved therein a water-soluble, volatile, fugitive nitrogen base having an atmospheric pressure boiling point not higher than 200° C., in a small amount, sufficient substantially to inhibit deterioration of the emulsified state of said emulsion by the addition thereto of said alkali metal dichromate solution.

5. The process of claim 4 wherein the fugitive nitrogen base is morpholine.

6. The process of claim 4 wherein the fugitive nitrogen base is trimethylamine.

7. The process of claim 4 wherein the said thermoplastic substance is asphalt.

8. The process of claim 4 wherein the alkali metal dichromate is sodium dichromate.

9. The process of claim 4 wherein the alkali metal dichromate is potassium dichromate.

10. An oil-in-water type emulsion consisting essentially of an emulsifying agent, water as the continuous phase, and an organic, water-insoluble, water-dispersible, thermoplastic, resinous substance, as the dispersed phase, the emulsified state of said emulsion normally being subject to at least partial breakdown by the addition thereto of an aqueous alkali metal dichromate solution, said emulsion having, in a small amount sufficient substantially to promote adhesion of the dispersed material to hydrophilic aggregate, incorporated therein an aqueous alkali metal dichromate solution having dissolved therein a water-soluble, volatile, fugitive nitrogen base having an atmospheric pressure boiling point not higher than 200° C., in a small amount sufficient substantially to inhibit breakdown of the emulsified state of said emulsion by the incorporation therein of said alkali metal dichromate.

11. The emulsion of claim 10 wherein said fugitive nitrogen base is morpholine.

12. The emulsion of claim 10 wherein the fugitive nitrogen base is trimethylamine.

13. The emulsion of claim 10 wherein said thermoplastic resinous material is asphalt.

14. The emulsion of claim 10 wherein the emulsion in which said aqueous solution is incorporated has a demulsibility by the A. S. T. M. D401-40 test of at least 60%.

15. The emulsion of claim 10 wherein the alkali metal dichromate is sodium dichromate.

16. The emulsion of claim 10 wherein the alkali metal dichromate is potassium dichromate.

PAUL E. McCOY.
GEORGE S. SMITH.

REFERENCES CITED

The following references are of record in the file of this patent:

UNITED STATES PATENTS

| Number | Name | Date |
| --- | --- | --- |
| 2,412,526 | McCoy | Dec. 10, 1946 |
| 2,412,545 | Watts | Dec. 10, 1946 |
| 2,330,100 | Williams | Sept. 21, 1943 |
| 2,256,886 | Buckley | Sept. 23, 1941 |

FOREIGN PATENTS

| Number | Country | Date |
| --- | --- | --- |
| 547,242 | Great Britain | Aug. 19, 1942 |
| 538,105 | Great Britain | July 21, 1941 |
| 465,589 | Great Britain | May 10, 1937 |
| 341,443 | Great Britain | Jan. 9, 1931 |
| 229,361 | Great Britain | Feb. 19, 1925 |